(12) United States Patent
Fujiwara et al.

(10) Patent No.: US 6,340,067 B1
(45) Date of Patent: Jan. 22, 2002

(54) BICYCLE EQUIPPED WITH DRIVE ASSIST

(75) Inventors: Nobuhiro Fujiwara; Atsushi Mamiya, both of Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/435,631

(22) Filed: Nov. 8, 1999

(30) Foreign Application Priority Data

Nov. 11, 1998 (JP) .......................................... 10-320752

(51) Int. Cl.⁷ .............................................. B62K 11/00
(52) U.S. Cl. ...................... 180/206; 280/214; 280/253
(58) Field of Search ................................ 280/252, 253, 280/259, 256, 214; 180/205, 206, 207

(56) References Cited

U.S. PATENT DOCUMENTS

| | | | | |
|---|---|---|---|---|
| 1,505,271 A | * | 8/1924 | McNeil | 280/253 |
| 1,577,585 A | * | 3/1926 | Montiglio | 280/257 |
| 2,424,639 A | * | 7/1947 | Sobirai | 280/257 |
| 5,341,892 A | * | 8/1994 | Hirose et al. | 180/220 |
| 5,474,148 A | * | 12/1995 | Takata | 180/206 |
| 5,681,234 A | * | 10/1997 | Ethington | 474/70 |
| 5,826,675 A | | 10/1998 | Yamamoto | 180/220 |
| 5,984,335 A | * | 11/1999 | Tseng | 280/253 |
| 5,992,553 A | * | 11/1999 | Morrison | 180/206 |

FOREIGN PATENT DOCUMENTS

| | | |
|---|---|---|
| FR | 881 632 | 12/1943 |
| FR | 2 745 783 | 1/1996 |

* cited by examiner

*Primary Examiner*—Robert P. Olszewski
*Assistant Examiner*—Michael Cuff
(74) *Attorney, Agent, or Firm*—Rader, Fishman & Grauer PLLC; Ronald P. Kananen, Esq.

(57) ABSTRACT

A pedaling force detection means can be simplified in arrangement, the number of assemblies thereof can be decreased, the pedaling force detection means can be made inexpensive and can detect a pedaling force reliably. A bicycle comprises a drive assist attached to a driving wheel (3), a driving power transmission means (20) attached between a sprocket (26) and a rear wheel, a pair of pedal levers (22), a crank lever (30R) for transmitting a rotation force of the pedal lever to the sprocket and a sliding portion (40R) serving as a swing fulcrum of the pedal lever. A slide pin (42R) at one end of the pedal lever slides within the slide portion in accordance with the rotation of the pedal lever to transmit a rotation force generated by the rotation of the pedal lever to the rear wheel through the sprocket. A pedaling force sensor (52) is attached to a part of the pedal lever which makes nearly reciprocating motion, and the output from the sensor is supplied through a signal wire (54) or the like to a controller which controls the drive-assist. An assist timing of the drive-assist is controlled based on the output from the sensor. Since the output from the pedaling force sensor maybe transmitted via the signal wire, the pedaling force sensor becomes high in accuracy, high in response and becomes low in loss. The mechanism of the pedaling force sensor is simple.

4 Claims, 7 Drawing Sheets

BICYCLE EQUIPPED WITH DRIVE ASSIST

BACKGROUND OF THE INVENTION

1. Field of the Invention

This invention relates to a bicycle equipped with a drive assist, and particularly to a bicycle equipped with a drive assist in which a drive assist is attached to a novel bicycle in which a trajectory of motion of a pedal lever becomes almost reciprocating motion by using a rotation transmission mechanism having a swing fulcrum, a pedaling force sensor for determining an assist timing of a drive assist is attached to the pedal lever and in which the output from the pedaling force sensor is introduced into a controller through a wire, thereby arranging a pedaling force sensor of a high accuracy and a high response which need not be adjusted.

2. Description of the Related Art

Heretofore, there has been developed a bicycle equipped with a drive assist, i.e. what might be called a motor assist bicycle. This motor assist bicycle has a drive assist with a battery-operating motor attached to a front or rear wheel in order to decrease a load on a user (bicyclist) who rides on a bicycle by operating the drive assist to reduce a pedaling force when a cyclist rides a bicycle in the steep hill where a load is imposed upon the user.

Since assist can be given to a user by a drive assist within a range allowed by regulations, necessity of assist is determined by detecting a pedaling force applied to a pedal lever, and assist is given to a user when a detected pedaling force exceeds a reference value. When such assist timing is determined, a pedaling force should be detected by any means. The user's pedaling force is measured with the highest accuracy by the pedal lever. To this end, a known pedaling force sensor is attached to the pedal lever so that, when an output from this pedaling force sensor exceeds a reference value, it is determined that assist done by the drive assist is necessary.

When the pedaling force sensor is attached to the pedal lever to measure the pedaling force applied to the pedal lever, the pedal lever is rotated as is conventional so that an output from the pedaling force sensor can not be transmitted through a signal wire (cable) because the signal wire will disturb the rotation motion of the pedal.

For this reason, heretofore, the output from the pedaling force sensor is transmitted to the outside by a suitable means such as a slip ring. However, since a rotary transformer mechanism such as a slip ring is used to transmit the output from the pedaling force sensor to the outside, there arises the problem that the pedaling force detection means will become expensive unavoidably.

There is known an arrangement using not the rotary transformer mechanism but a transmission mechanism such as a cam to transmit the output from the pedaling force sensor to the outside. However, also in this case, since the arrangement comprising a mechanical transducer system such as a number of cams is used, transmission accuracy is not sufficient, and a response speed also is not sufficient. Moreover, since there occurs a transmission loss and there are required increased assemblies, a mutual adjustment becomes necessary, and there arises a problem of maintenance.

SUMMARY OF THE INVENTION

It is an object of the present invention to provide a bicycle equipped with a drive assist in which the aforementioned problems can be solved.

According to the present invention, particularly, a drive assist is attached to a novel bicycle in which a trajectory of motion of a pedal lever can be made substantially a reciprocating motion by a rotation transmission mechanism having a swing fulcrum. Also, a pedaling force sensor for determining an assist timing of the drive assist is attached to the pedal lever and an output from the pedaling force sensor is transmitted to a controller through a cable, thereby arranging a pedaling force detection means of high accuracy and high response which can be made free from adjustment.

According to an aspect of the present invention, there is provided a bicycle equipped with a drive assist. This bicycle equipped with a drive assist is comprised of a drive assist attached to a driving wheel, a sprocket provided near a bottom bracket point of a frame comprising a bicycle body, a driving power transmission means attached between the sprocket and a rear wheel, a pair of pedal lever having a phase difference of 180°, a crank lever provided between said sprocket and one of the pedal levers to transmit a rotation force to the sprocket and a sliding portion serving as a swing fulcrum of the pedal lever, wherein a slide pin provided on one end of the pedal lever slides within the sliding portion in accordance with the rotation of the pedal lever to transmit a rotation force generated in accordance with the rotation of the pedal lever to the rear wheel through the sprocket, a pedaling force sensor attached to a part of the pedal lever which reciprocates approximately, an output from the pedaling force sensor is supplied through a signal line to a controller which controls the drive assist and the bicycle controls an assist timing at which the drive assist is used as a pedal drive assist means based on the output from the pedaling force sensor.

According to the present invention, a rotation force (pedaling force) of the pedal lever is transmitted through the crank lever to the sprocket and there is provided the swing fulcrum to swing the pedal lever. Thus, a bicycle is arranged such that the pedal lever executes substantially a reciprocating motion. That is, the trajectory of the motion of the pedal lever is changed from the rotation motion to the reciprocating motion.

Since the trajectory of the motion of the pedal lever becomes substantially the reciprocating motion, when the pedaling force to the pedal lever is detected by the pedaling force sensor attached to the pedal lever, the output from the pedaling force sensor maybe transmitted through the signal line (cable) to the controller for the drive assist. That is, the output from the pedaling force sensor can be transmitted to the controller by means of the simple cable. Thus, since the pedaling force can be detected with a high accuracy and a high reliability, it is possible to detect the assist timing accurately.

DESCRIPTION OF THE PREFERRED EMBODIMENTS

A bicycle equipped with a drive assist according to embodiments of the present invention will be described below with reference to the drawings.

Figure 1:
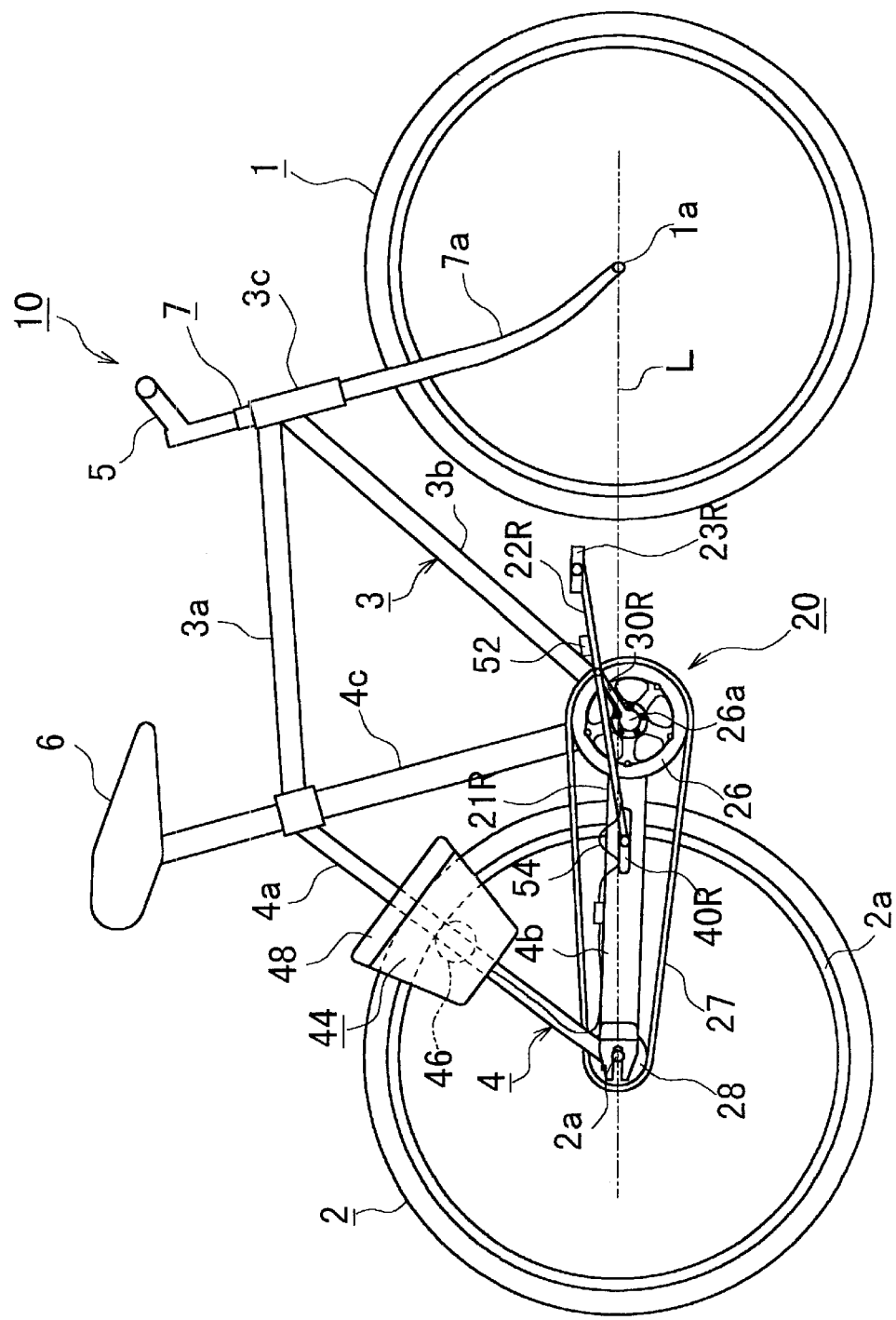
FIG. 1 is a side view showing a bicycle equipped with a drive assist according to an embodiment of the present invention.

FIG. 1 of the accompanying drawings shows an embodiment in which the present invention is applied to a novel bicycle.

A bicycle 10 is able to move a pedal lever in substantially a reciprocating motion to transmit a pedaling force (rotation force) applied to a pedal lever to a drive wheel. In order to enable the pedal lever to move in a reciprocating motion, a rotation transmission mechanism 20 from the pedal lever to the sprocket is arranged as a rotation transmission mechanism having a swing fulcrum.

As shown in FIG. 1, this bicycle 10 includes a front wheel 1 and a rear wheel 2 which are driving wheel similarly to the existing bicycle. The front wheel 1 and the rear wheel 2 are joined by a pair of delta-like frames 3, 4. Handlebars 5 are attached to the front frame 3 side, and a seat 6 is attached to the rear frame 4 side.

An axle 1a of the front wheel 1 is rotationally fixed to the tip end of a forked portion 7a formed on the lower portion of a stem 7. The handlebars 5 are attached to the upper portion of the stem 7 as a wheeling device.

Connecting portions 3a, 3b comprising the front frame 3 are horizontally and downwardly extended from a supporting portion 3c which rotationally holds the stem 7. The tip end portions of these connecting portions 3a, 3b are connected to a seat frame 4c comprising the rear frame 4 and which becomes approximately parallel to the stem 7. A seat 6 is attached to the seat frame 4c so that a user may properly adjust the height of the seat according to the need.

Two connecting portions (connecting frames) 4a, 4b comprising the rear frame 4 are extended from the two connecting portions 3a, 3b, and tip ends of these connecting portions 4a, 4b are connected with each other, thereby holding the axle 2a of the rear wheel 2 horizontally. A gear 28 is attached to the axle 2a to transmit a rotational force transmitted from a pedal lever 22 to a sprocket 26 to the gear 28 through a drive chain 27. An axle 26a of the sprocket 26 is selected as a bottom bracket point (intersection between the frames 3b and 4c).

Pedal levers 22R are linear levers (pedal arms). A pair of pedal levers are attached to the left and right of the sprocket 26 with a phase difference of 180°. In this embodiment, the sprocket 26 is attached to the frames 3, 4 on the right-hand side of the driving direction. A crank lever (crank arm) 30R is attached to the sprocket 26 at its position between the sprocket 26 and the pedal lever 22R, whereby a rotational force of the pedal lever 22R is transmitted to the sprocket 26 through this crank lever 30R.

Figure 2:
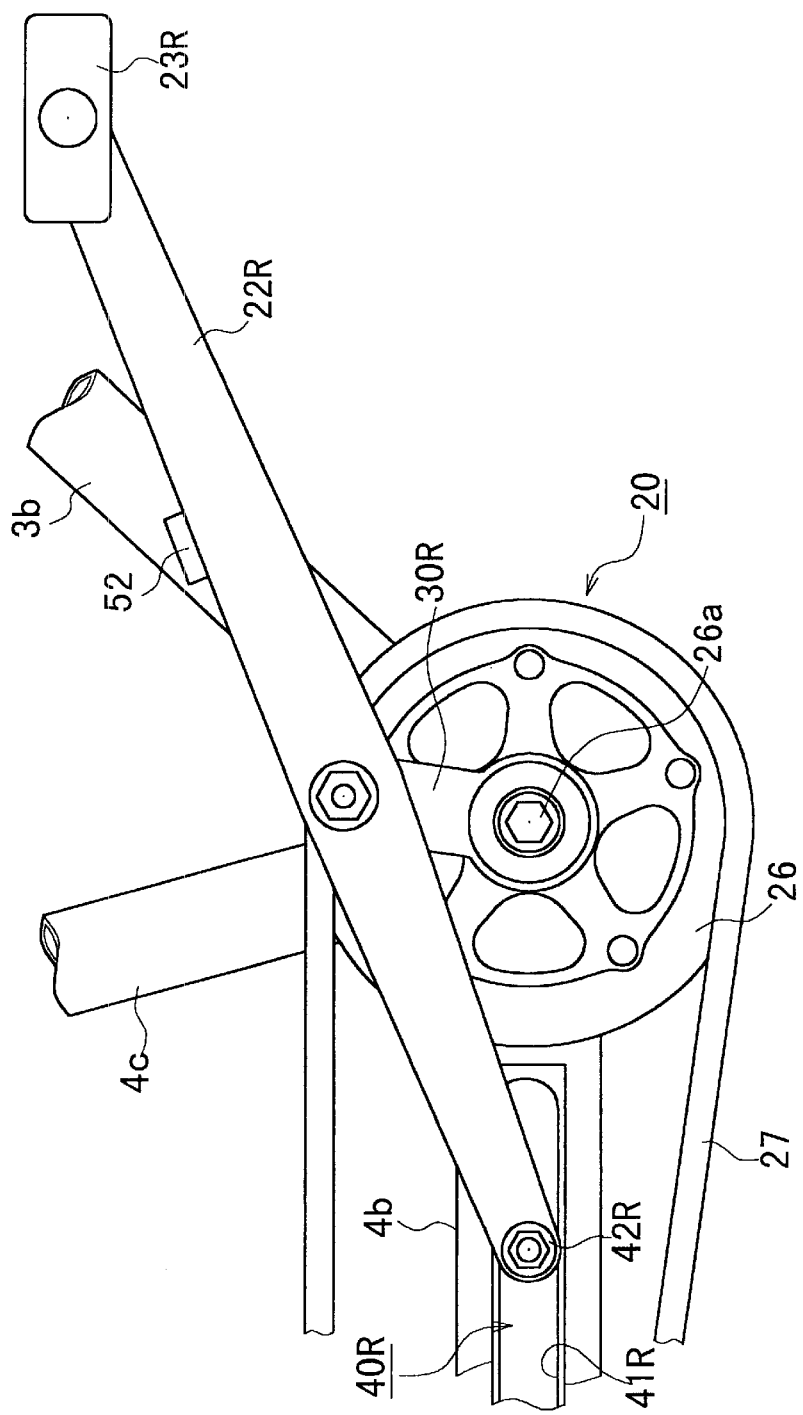
FIG. 2 is a side view showing a rotation transmission mechanism having a swing fulcrum according to the embodiment of the present invention in a partly enlarged-scale.

A pedal 23R is attached to the tip end portion of the pedal lever 22R and the other end side of the pedal lever acts as a swing fulcrum. To this end, as shown in FIG. 2, a slide pin 42R (or slide roller) is fixed to the other end portion of the pedal lever 22R. This slide pin 42R is fitted into a slide groove 41R comprising a slide portion 40R and can be slid along the slide groove 41R within the slide groove 41R in the right and left direction.

The slide portion 40R is the outer side surface of the connecting portion (rear frame) 4b and is placed on the drive wheel axle (line L connecting the axles of the front and rear wheels 1, 2) shown in FIG. 1. In this embodiment, the linear slide groove 41R comprises the slide portion 40R. The slide pin 42R is fitted into the slide groove 41R with a very small clearance. The slide portion 40R may be made of a suitable material such as an oilless metal, thereby decreasing a slide friction of the slide pin 42R. A dustproof (not shown) case may cover the slide groove 41R so as to prevent dusts or the like entering the slide groove 41R. Moreover, in order to decrease a friction between the slide groove and the slide pin 42R, the slide portion 40R and the slide pin 42R may be treated by plating.

When the pedal 23R is placed at a top dead point (uppermost point) of the sprocket 26, the lever 30R also is placed substantially near the top dead point, and the position at which the slide portion 40R is attached to the connecting point 4B is selected in such a manner that the slide pin 42R is placed at substantially the center portion (center point) of the slide groove 41R. Therefore, the right-handside of the center portion becomes the trajectory of the motion of the first half period (pedal period) extending from the top dead point to the bottom dead point (lowermost point), and the left-hand side thereof becomes the trajectory of the motion of the second half period extending from the bottom dead point to the original top dead point.

FIG. 1 shows the arrangement in which the gear 28 is attached to the bicycle 10 at the right-hand side of the driving direction. Although a rotation transmission mechanism 20 such as the sprocket 26, the pedal lever 22R and the crank lever 30R is disposed on the right-hand side of the driving direction, the rotation transmission mechanism 20 may be disposed in the left-hand side of the driving direction.

Of the rotation transmission mechanism 20, the sprocket 26 and the drive chain 27 are not provided on the left-hand side of the driving direction but the pedal lever 22L, the crank lever 30L and the sliding portion 40L which are other members are provided on the left-hand side of the driving direction. Detailed arrangements of these members will not be described and shown herein, respectively.

When the rotation transmission mechanism 20 is arranged as described above, a pedaling force on the pedal 23R (pedaling force) is transmitted to the sprocket 26 through the crank lever 30R. Since the drive chain 27 is extended between the sprocket 26 and the rear wheel gear 28 as a driving force transmission means, the rotation force transmitted to the sprocket 26 is transmitted to the gear 28 to drive the rear wheel 2, thereby driving the bicycle 10.

Figure 3:
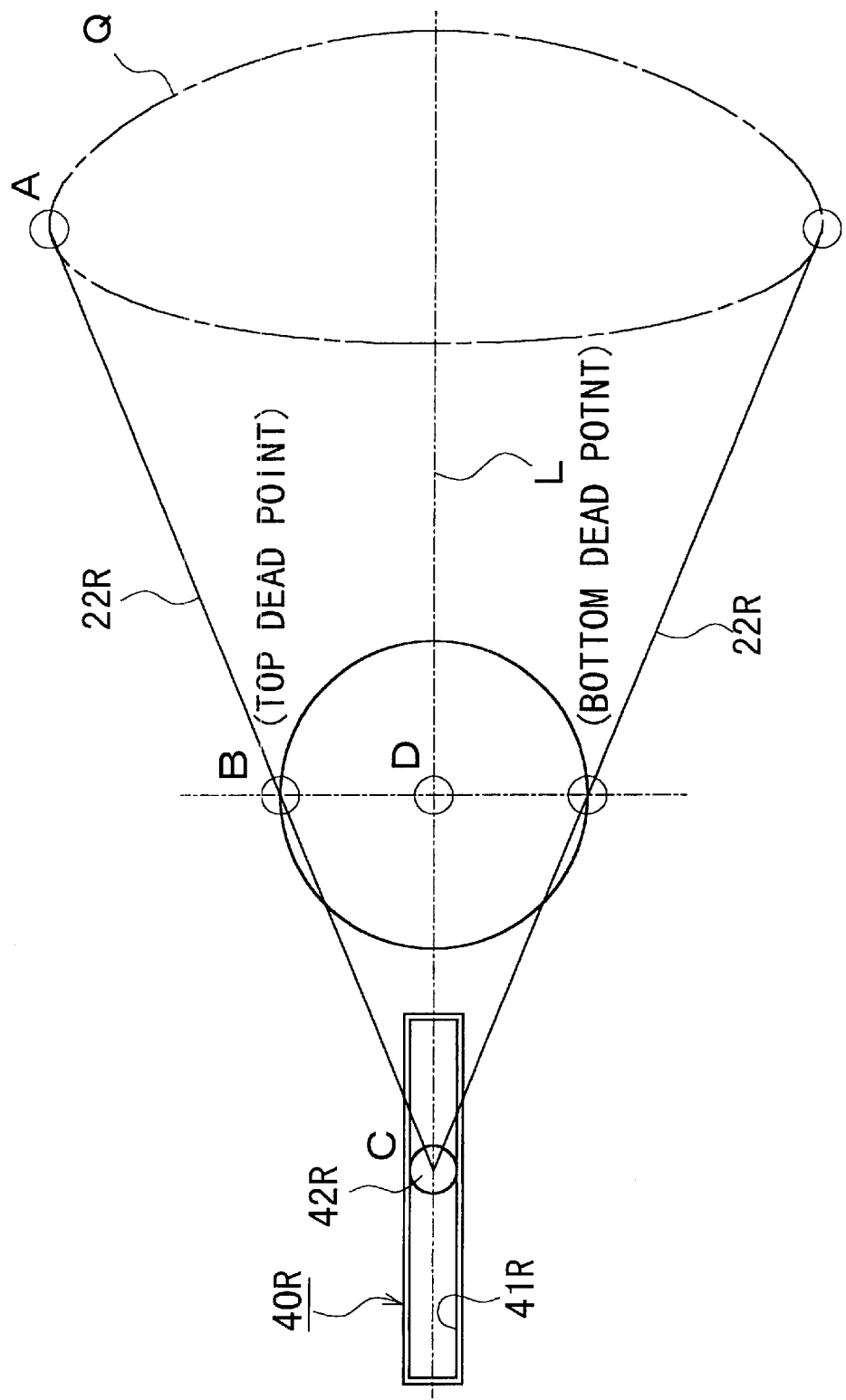
FIG. 3 is a diagram showing a trajectory Q of motion of a pedal obtained at that very time.

FIG. 3 shows an example of a trajectory Q of motion of the pedal 23R obtained when the pedal 23R is rotated once by the pedaling force. The trajectory Q of motion of the pedal 23R becomes a circular motion or a linear motion in the upper and lower direction depending upon a ratio between the lengths of the intersections of the sprocket 26 and the crank lever 30R.

Depending upon the ratio (AB:BC) between the lengths of the pedal lever 22R obtained when respective points A, B, C, D are determined as shown in FIG. 3, the trajectory Q of motion is changed as circular motion, elliptic motion and linear motion, in that order. Then, when AB:BC=BC:BD=

2:1, the pedal 23R can draw the trajectory Q of motion which is approximately the linear motion in the upper and lower direction.

FIG. 3 shows the example of an intermediate between the circular motion and the linear motion, and illustrates a trajectory Q of motion which is nearly an elliptic motion (almost linear reciprocating motion). It was proved that the elliptic motion becomes almost linear motion during the second half period of the pedal 23R except the top dead point and the bottom dead point while the elliptic motion becomes almost elliptic rotation trajectory during the first half period.

Figure 4:
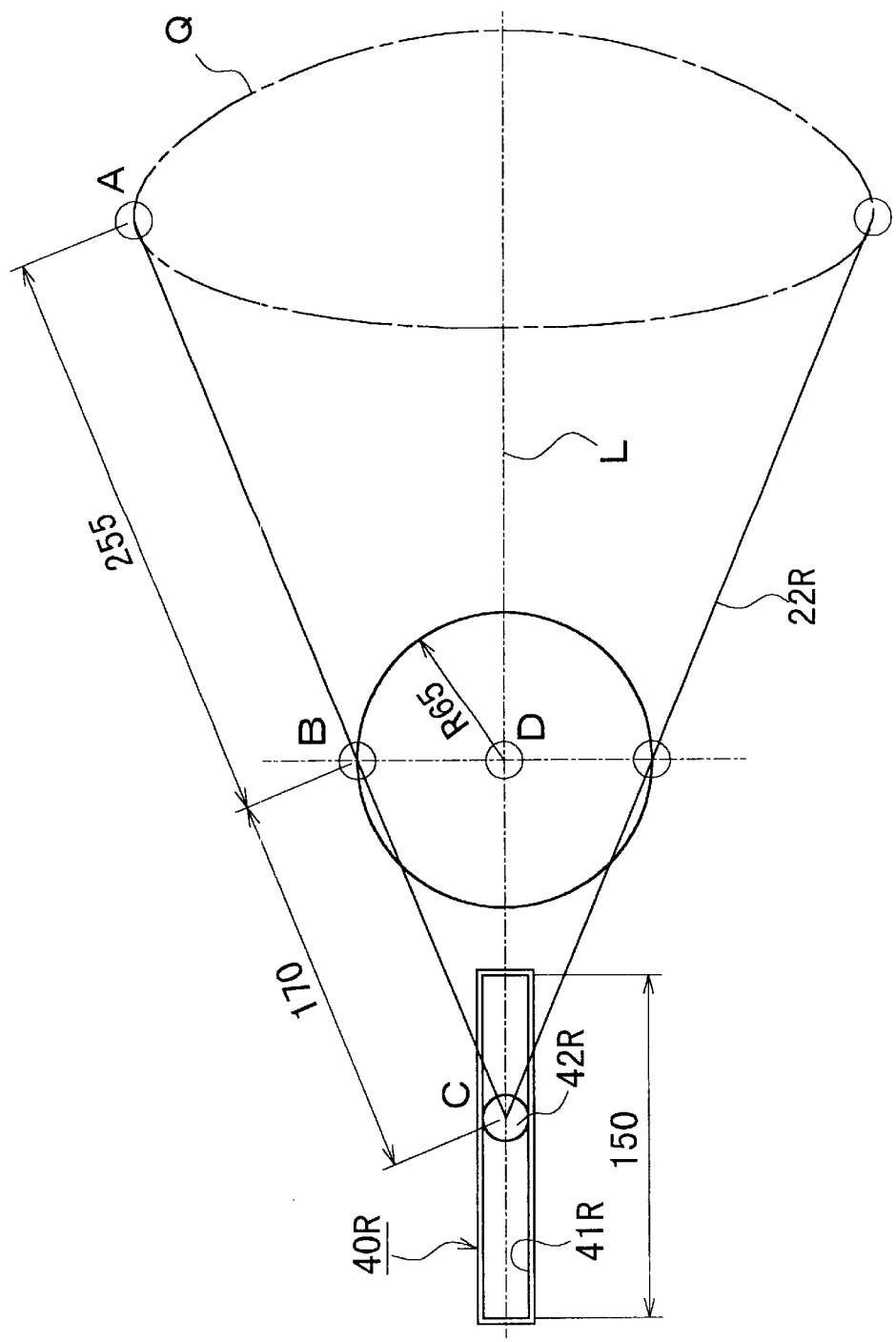
FIG. 4 is a diagram showing a relationship of dimensions of a rotation transmission mechanism.

We had examined numerical values of the above respective points in actual practice. When a user has an average form (when a user is about 170 centimeters tall), the diameter of the driving wheels 1, 2 is almost 20 to 26 inches. Thus, in this case, numerical values (AB=200 to 300 mm, BC=100 to 200 mm, BD=50 to 100 mm) shown in FIG. 4 are suitable numerical values. At that very time, it is sufficient that the slide length of the slide portion 40R ranges approximately 100 to 250 mm.

We had made experiments under the condition that numerical values are AB=255 mm, BC=170 mm and BD=65 mm. A study of measured results reveals that the slide length of the slide portion 40R was 150 mm. At that very time, we had the elliptic trajectory shown in FIG. 3.

When the sprocket 26 is rotated by applying the pedaling force to the pedal 23R while the swing fulcrum of the pedal lever 22R is being slid in the left and right direction of the driving wheel axle L and the rotation driving force is transmitted to the rear wheel 2 via the drive chain 2, a user is able to drive the bicycle 10. A similar driving force may be obtained by the pedaling force applied to the pedal 23L (though not shown) of the opposite side. Although a part of the pedal 23 (23R, 23L) presents an elliptic trajectory, the pedal presents an ellipse whose major axis is long. Hence, the trajectory of motion of the pedal becomes the trajectory Q of motion which is almost straight line on the whole.

As a result, the range of the upper and lower reciprocating motion of the pedal 23 (23R, 23L) is reduced so that a user becomes able to handle the pedal 23 more easily. Moreover, since the pedaling force applied to the pedal 23 is increased, a rotation torque of the pedal 23 increases to enable a user to drive the bicycle 10 by a smaller force.

Moreover, since the swing fulcrum of the pedal lever 22 (22R, 22L) is not of the fixed type but of the horizontal slide type, even when the pedal 23 is rotated once, the rotation of the pedal becomes smooth. In this connection, when the swing fulcrum of the pedal lever 22 is of the fixed type, it was proved that the pedal 23 can not be rotated once smoothly.

The bicycle 10 with such reciprocating pedal lever includes a drive assist 44 attached to the predetermined position of the rear wheel 2, in this embodiment, as shown in FIG. 1. The drive assist 44 incorporates therein a well-known electric motor which is driven by a battery. A rotation force of this motor is transmitted to a transmission wheel 46 via a rotation transmission mechanism (not shown) comprising cams and gears.

Since the transmission wheel 46 is brought in contact with the rim 2a of the rear wheel 2, the rotation force of the electric motor is transmitted to the rear wheel 2 through the transmission wheel 46 so that a user may drive the bicycle 10 in cooperation with the pedaling force applied to the pedal lever 22R. Thus, it is possible to decrease the pedaling force load (pedaling force). The drive assist 44 incorporates therein a controller 48 comprising suitable elements such as a system controller in order to determine an assist timing at which the drive assist can be made.

The assist timing is determined by detecting the pedaling force applied to the pedal lever 22. To this end, a pedaling force sensor 52 is attached to the pedal lever 22R as shown in FIG. 1. As the pedaling force sensor 52, there may be used sensors such as a strain gauge.

Figure 5:
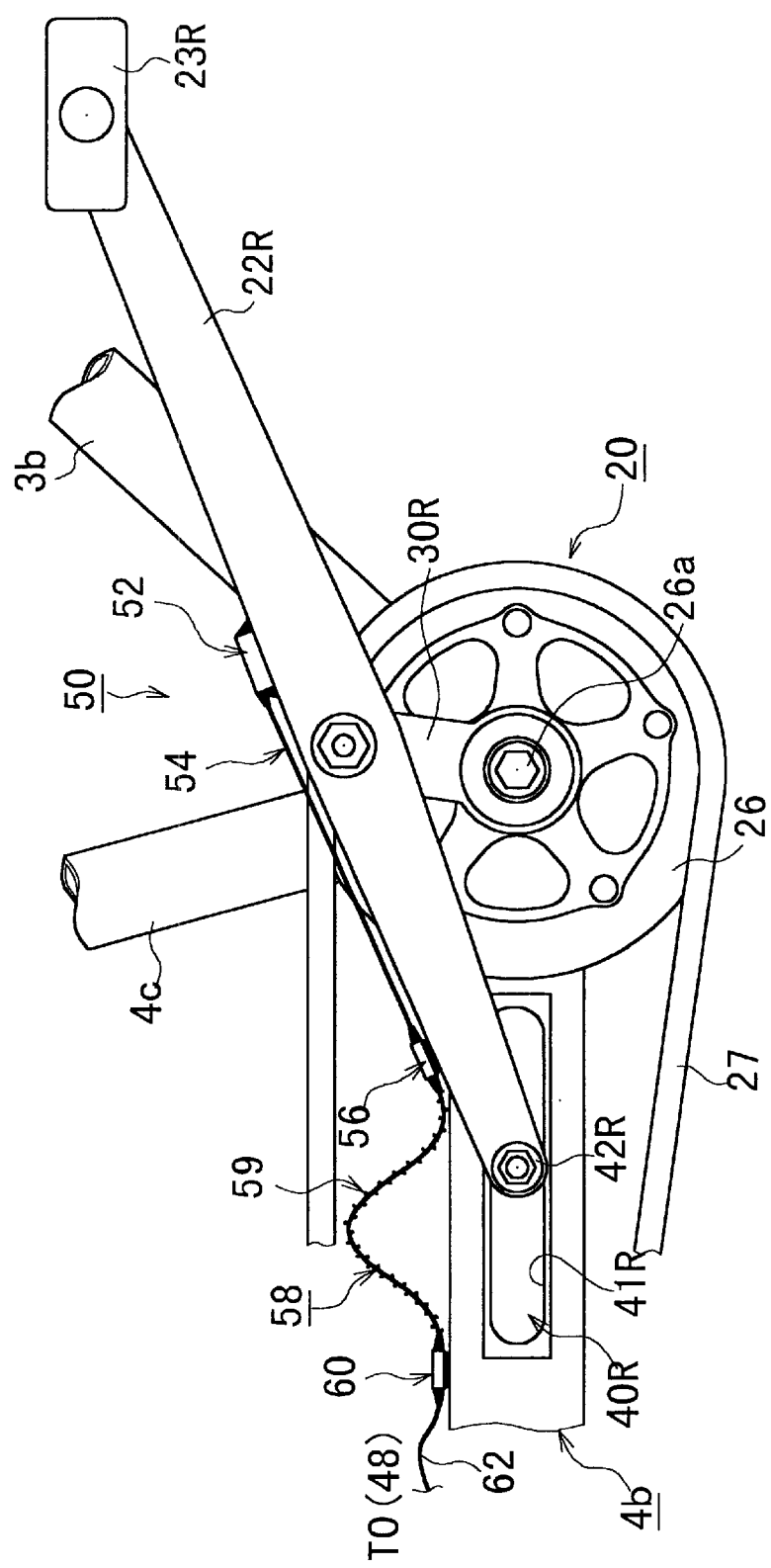
FIG. 5 is a diagram showing a main portion of a pedaling force detection means according to the embodiment of the present invention in an enlarged-scale.

FIG. 5 shows a pedaling force detection means 50 which uses this pedaling force sensor 52 according to an embodiment of the present invention. In FIG. 5, the pedaling force sensor 52 is attached to the predetermined outer peripheral surface of the pedal lever 22R, in this embodiment, the peripheral portion in which a strain applied to the pedal lever 22R becomes largest, in the illustrated example, the outer peripheral surface of the pedal lever 22R near the pedal 23R in the vicinity of the connecting portion of the crank lever 30 and the pedal lever.

An output from the pedaling force sensor 52 is outputted via a signal wire. In this embodiment, a signal wire harness 54 is used as the signal wire. This signal wire harness is extended to a fixed section 56 such as a fixed clip attached to the pedal lever 22R. The wire harness 54 is fixed on the pedal lever 22R by the fixed section 56. The signal wire from the fixed section 56 and a fixed section 60 on the bicycle body provided on the rear frame 4b are connected by an illustrated flexible wire harness 58.

As the flexible wire harness 58, there may be used a flexible wire harness having a guide 59 with a protect or disposed on the outer surface thereof so as to prevent a wire from being inadvertently wound into the slide portion 40R. The length of the flexible wire harness 58 is selected to be long in consideration of the swing length of the pedal lever 22R as illustrated. A body-side wire harness 62 is further coupled to the body-side fixed section 60, and the tip end of this harness is connected to the controller 48 shown in FIG. 1.

When the pedaling force detection means 50 is arranged as described above, the pedal lever 22R makes approximately upper and lower reciprocating motion and the swing fulcrum 42R slides right and left within the slide portion 40R. Therefore, the pedaling force sensor 52 is attached to a part of the outer peripheral surface of the pedal lever 22R, and an output from this sensor may be introduced into the controller 48. Both of the wire harnesses 54, 62 may be respectively fixed to the pedal lever 22R side and the bicycle body side. It is sufficient that the free length of only the flexible wire harness 58 is selected so as to allow a certain degree of margin in consideration of the swing length of the flexible wire harness 58.

Since the pedaling force sensor 52 is exposed to the outside, the pedaling force sensor may include a protecting means (cover) for protecting itself from rainwater and from being damaged.

Since the output from the pedaling force sensor 52 may be directly supplied to the controller 48 through the signal wire, the strain applied to the pedal lever 22R may be detected with a high accuracy, a high response and a low loss. Therefore, it is possible for a user to more accurately determine the assist timing. Of course, since the pedaling force detection means 50 may be arranged without using the transmission system such as a mechanical transducer system and a rotary transformer, it is possible to realize the inexpensive detection means which is not the straight line.

Figure 6:
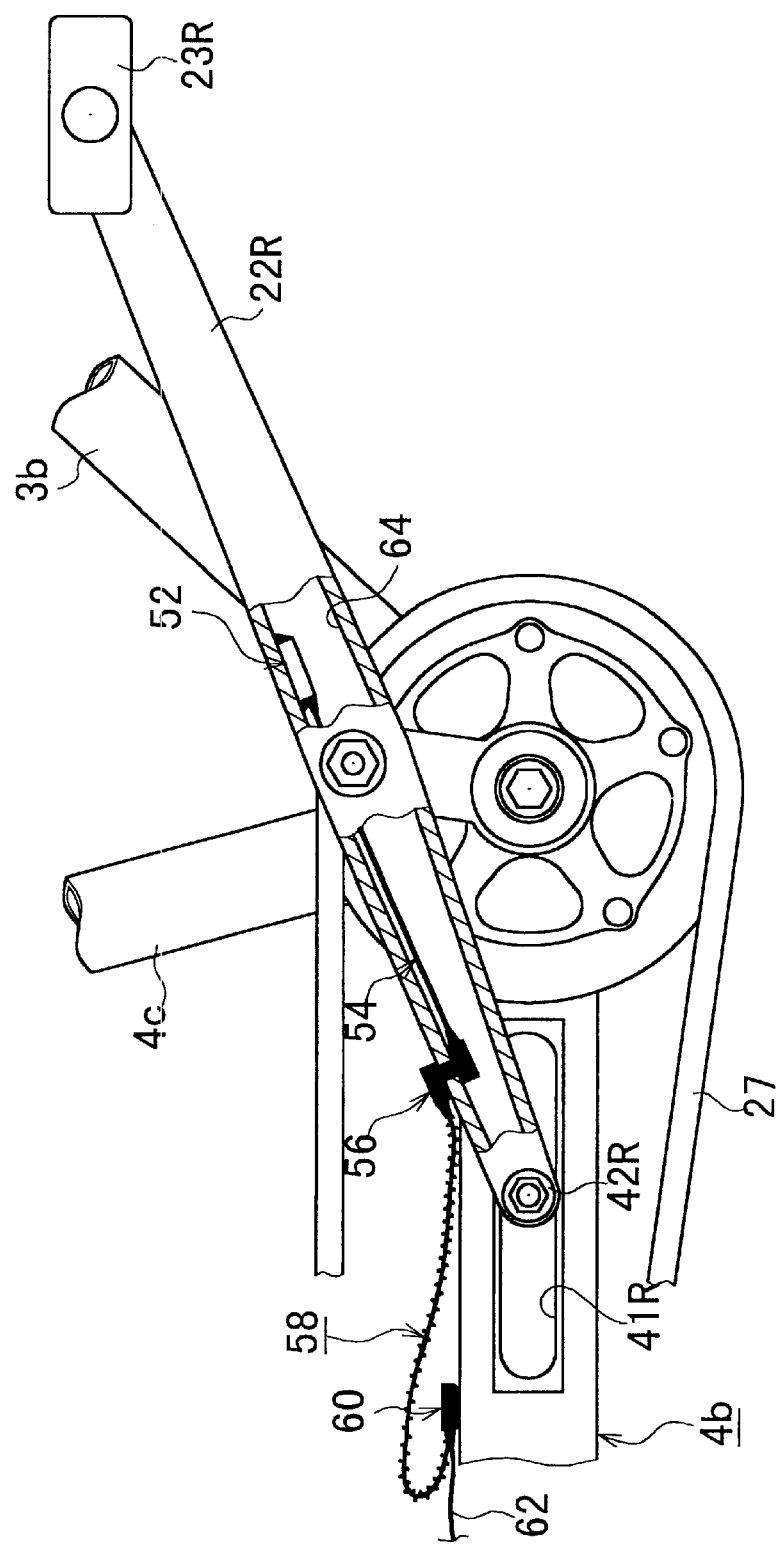
FIG. 6 is a diagram similar to FIG. 5 showing a main portion of the pedaling force detection means according to other embodiment of the present invention in an enlarged-scale.

FIG. 6 is a fragmentary diagram similar to FIG. 5 and illustrates other embodiment of this invention. This embodiment describes a case in which the pedaling force sensor 52 is attached to the inside of the pedal lever 22R.

To this end, the pedal lever 22 is hollow in cross-section as illustrated, and the pedaling force sensor 52 is attached to the pedal lever 22 at the same position as described above in a part of the hollow inner wall. The output from the pedaling force sensor 52 is similarly connected through the wire harness 54 of the pedal side to the fixed section 56. The fixed section 56 serves both as the coupling member of the inside and the outside and the harness fixing member. The fixed section 56 which is exposed to the outside is connected to the body-side fixed section 60 by the flexible wire harness 58. Also in this case, the length of the wire harness 58 is selected so as to allow a certain degree of margin.

According to this arrangement, since the pedaling force sensor 52, in particular, is attached to the inside of the pedal lever 22R, the pedaling sensor may take every possible countermeasures against rainwater. Furthermore, since the pedaling force sensor is attached to the inside of the pedal lever, the protection means also becomes unnecessary.

Figures 7A, 7B:
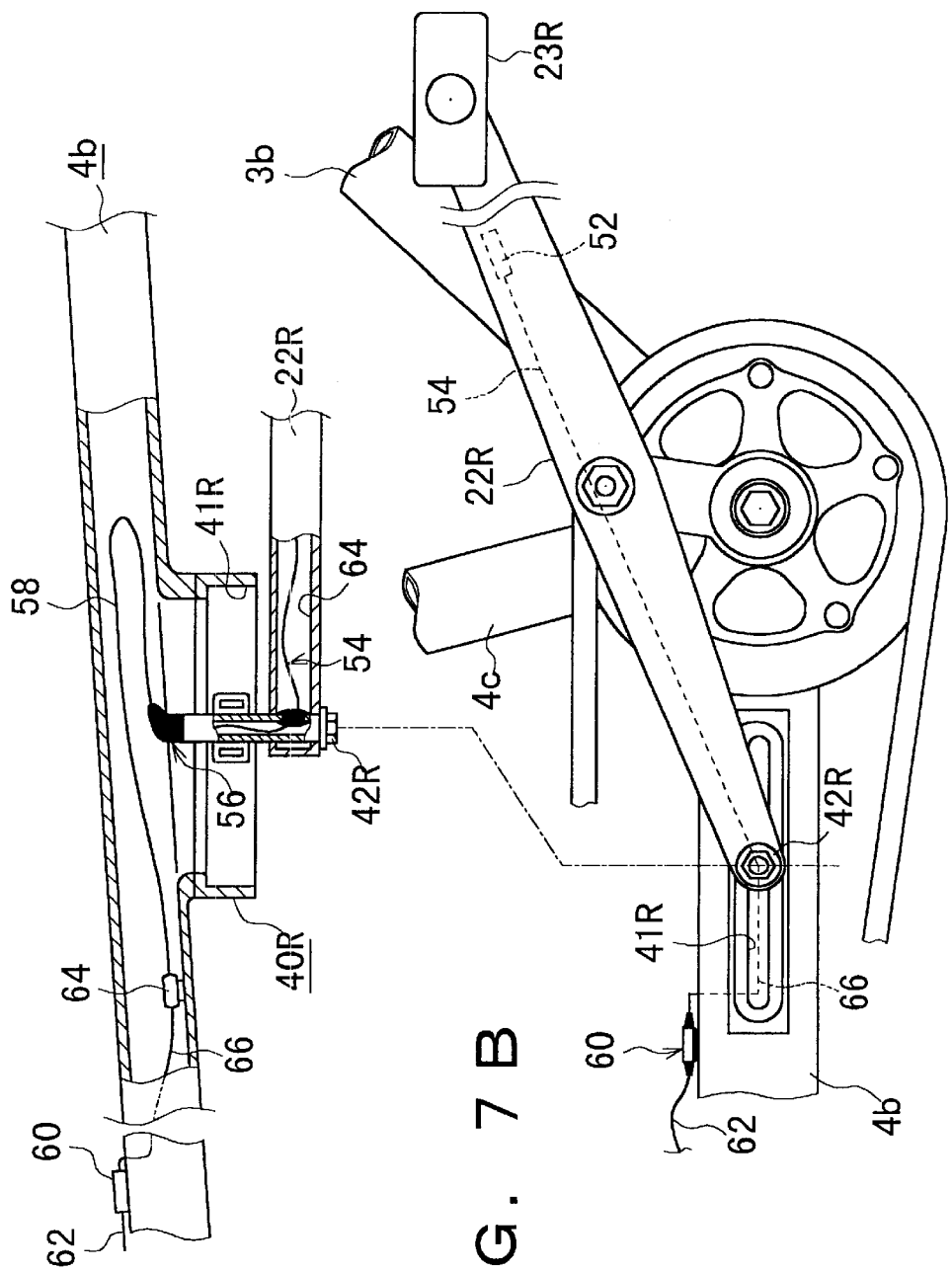
FIGS. 7A and 7B are diagrams similar to FIG. 5 showing a main portion of the pedaling force detection means according to other embodiment of the present invention in an enlarged-scale.

FIGS. 7A and 7B show other embodiment of this invention. This embodiment is a modified example of FIG. 6. As shown in FIGS. 7A, 7B, the output from the pedaling force sensor is introduced into the rear frame 4b through the inside of the slide pin 43R. In the inside of the rear frame 4b, the pedaling force sensor and the rear frame are connected to each other by the flexible wire harness 58, the fixed section 64 and the wire harness 66. Then, the wire harness 66 is connected to the external fixed section 60.

In this arrangement, since the members which are exposed to the outside become a few, it becomes possible to make every possible measure to protect the pedaling force sensor and the wire harness more reliably.

The rotation force transmission means 20 maybe made modified variously. In particular, this invention may be applied to a bicycle including a rotation force transmission means in which a trajectory of motion of a pedal lever is not the rotation motion but almost reciprocating motion of linear motion or elliptic motion.

While the drive-chain drive system is illustrated as the driving power transmission means in the above-mentioned embodiments, the present invention may be similarly applied to a bicycle of a belt-drive system or a bicycle of a shaft-drive system.

According to this invention, by using the rotation transmission mechanism having the swing fulcrum, the drive assist is attached to the bicycle in which the trajectory of motion of the pedal lever becomes almost the reciprocating motion. At the same time, the pedaling force sensor for determining the assist timing of the drive assist is attached to the pedal lever, and the output from the pedaling force sensor is introduced into the controller.

Since the pedaling force sensor is attached to the pedal lever which makes almost the reciprocating motion, the output from the pedaling force sensor may be simply and reliably introduced into the controller for the drive assist by the signal wire (wire). That is, the output from the pedaling force sensor maybe transmitted to the controller by the simple wire connection. Thus, since the pedaling force may be detected with a high accuracy and a high reliability, it is possible to detect the assist timing accurately. The arrangement thereof also is simple and does not use the rotation transmission mechanism such as the rotary transformer and the mechanical transducer system using cams. There is then the actual profit that the pedaling force sensor may be made free from adjustment.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A bicycle equipped with a drive assist comprising: a drive assist attached to a driving wheel; a sprocket provided near a bottom bracket point of a front frame comprising a bicycle body; driving power transmission means attached between said sprocket and a rear wheel; a pair of pedal levers having a phase difference of 180°; a crank lever provided between said sprocket and one of said pedal levers to transmit a rotation force to said sprocket; and a sliding portion serving as a swing fulcrum of said pedal lever, wherein a slide pin is provided on one end of said pedal lever slides within said sliding portion in accordance with the rotation of said pedal lever to transmit a rotation force generated in accordance with the rotation of said pedal lever to said rear wheel through said sprocket, a pedaling force sensor attached to an inner or outer surface of said pedal lever at its portion in which a strain is large and which approximately reciprocates an output from said pedaling force sensor is supplied through a signal wire to a controller which controls said drive assist and said bicycle controls an assist timing at which said drive assist is used as a pedal drive assist means based on the output from said pedaling force sensor.

2. A bicycle equipped with a drive assist as claimed in claim 1, wherein said pedaling force sensor is attached to an outer peripheral surface of said pedal lever at its portion in which a strain is large.

3. A bicycle equipped with a drive assist as claimed in claim 1, wherein said signal wire is a wire harness and is connected to said controller through a plurality of fixing means and a flexible wire harness.

4. A bicycle equipped with a drive assist as claimed in claim 1, wherein said pedaling force sensor provided on the inner surface of said pedal lever and a connected wire harness are connected to a wire harness of a rear frame through a sliding shaft of said sliding portion and said wire harness is led out to the outside and connected to said controller.

* * * * *